Figure 1:
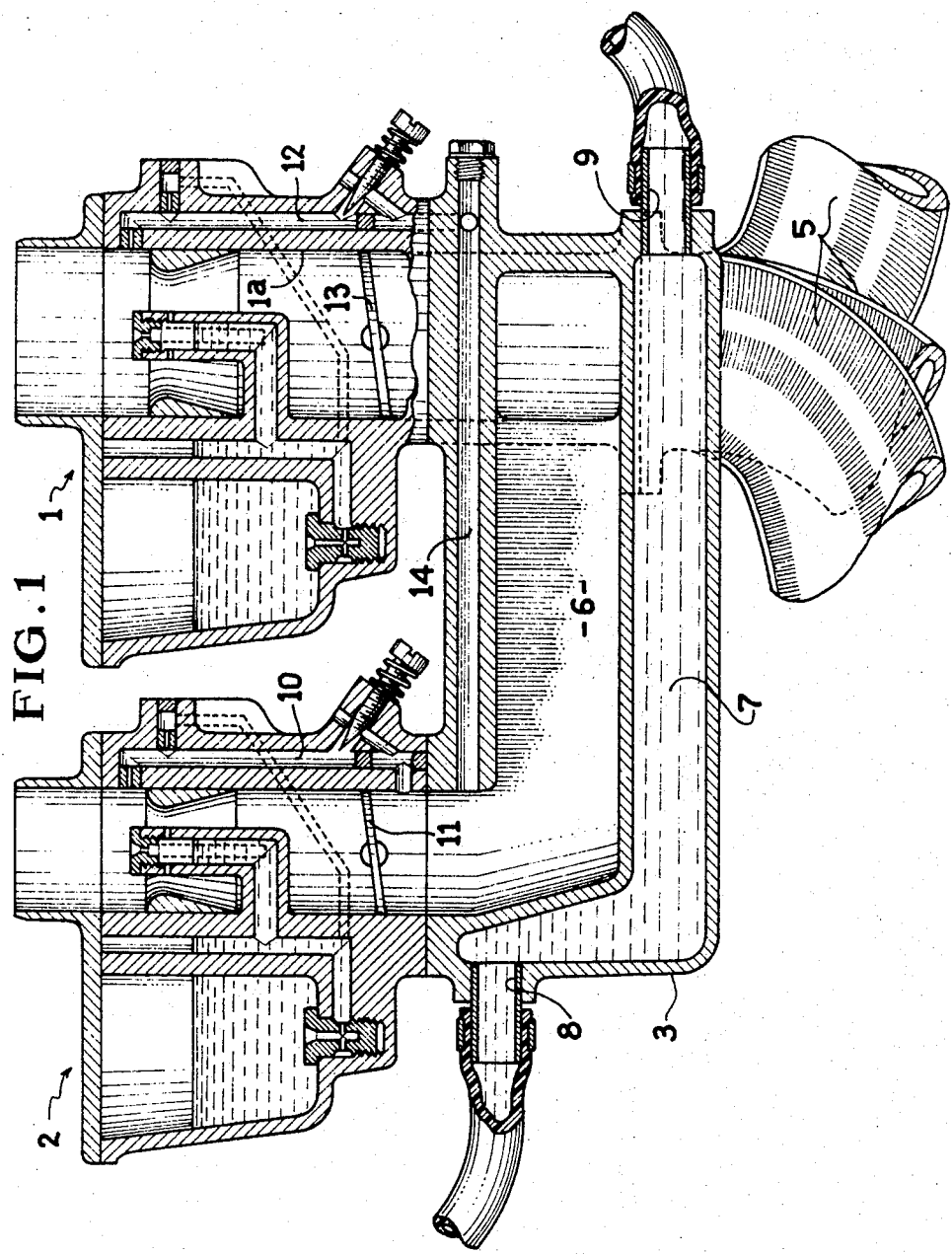

United States Patent

Sigwald

[11] 3,850,153
[45] Nov. 26, 1974

[54] CARBURETOR DEVICE FOR AN ENGINE
[75] Inventor: Jacques Sigwald, Taverny, France
[73] Assignees: Automobiles Peugeot, Paris; Regie Nationale Des Usines Renault, Billancourt, both of, France
[22] Filed: Nov. 28, 1972
[21] Appl. No.: 310,109

[30] Foreign Application Priority Data
Jan. 21, 1972 France .............................. 72.02021

[52] U.S. Cl.......... 123/127, 123/52 M, 123/52 MV, 123/59 PC, 123/122 A, 123/122 AB
[51] Int. Cl. ..................... F02m 13/04, F02m 31/14
[58] Field of Search......... 123/127, 52 M, 52 MV, 122 A, 123/122 AB, 59 PC

[56] References Cited
UNITED STATES PATENTS
| | | | |
|---|---|---|---|
| 1,099,842 | 6/1914 | Cobb | 123/127 X |
| 2,192,067 | 2/1940 | Betry | 123/52 MV X |
| 2,355,716 | 8/1944 | Ericson et al. | 123/127 |
| 2,460,046 | 1/1949 | Vincent | 123/127 |

FOREIGN PATENTS OR APPLICATIONS
939,780   3/1956   Germany ........................... 123/127

*Primary Examiner*—Charles J. Myhre
*Assistant Examiner*—Tony Argenbright
*Attorney, Agent, or Firm*—Burns, Doane, Swecker & Mathis

[57] ABSTRACT

Device for feeding a mixture of air and fuel to a multiple-cylinder engine comprising a large main carburetor for feeding fuel at full load and a small carburetor for feeding fuel at low loads and induction pipes connecting the carburetors to the engine cylinders through a junction. The small carburetor is disassociated from the main carburetor and its outlet, controlled by a throttle, is connected by a heating passage to the junction of the induction pipes downstream of the throttle controlling the outlet of the main carburetor.

4 Claims, 2 Drawing Figures

CARBURETOR DEVICE FOR AN ENGINE

The invention relates to a multiple-cylinder engines fed with a mixture of air and fuel by at least one carburetor element which ensures the principle feed at full load and another carburetor element ensuring the feed at low loads.

In this fuel feed system, a single unit comprises at least one large-section body which ensures in respect of high loads sufficient fuel feed without exaggerated pressure drops and a smaller body which enables a more precise regulation of the metering to be achieved for low loads. In this way rather good results are obtained as concerns driving pleasure, high powers, and limitation of the emission of pollutants. However, experience has shown that notwithstanding all the improvements in carburetors the exhaust gases still contain, particularly at low loads, a percentage of pollutants that it is desirable to reduce.

Moreover, fuel feed devices are known with a single carburetor having two throttles, namely one for full loads and the other for low loads, the air-fuel mixture conduit controlled by the low load throttle having an elongated shape where the mixture is heated and subjected to turbulence which ensures its homogeneity. Unfortunately, these systems do not result in a sufficiently precise regulation of the metering at low loads owing to the large dimensions of the carburetor required to meet the needs at high loads.

An object of the present invention is to provide an arrangement whereby it is possible to combine the advantages of the two aforementioned systems so as to lower the percentages of pollutants in the exhaust gases without adversely affecting the driving pleasure.

The invention provides a device for feeding a mixture of air and fuel of a multiple-cylinder explosion engine, comprising at least one large or main carburetor for feeding fuel at full load, a small fuel feed carburetor for low loads and induction pipes connecting said carburetor to each of the cylinders, wherein the small carburetor is disassociated from the large carburetor and its outlet, which is controlled by a throttle, is connected by a heating passage to the junction of the induction pipes downstream of the throttle controlling the outlet of the main carburetor.

According to another feature of the invention, the outlet of the idling circuit of the large carburetor is connected by a conduit to the inlet of said heating conduit downstream of the throttle of the small carburetor.

Further features and advantages of the invention will be apparent from the ensuing description with reference to the accompanying drawings.

Figure 2:
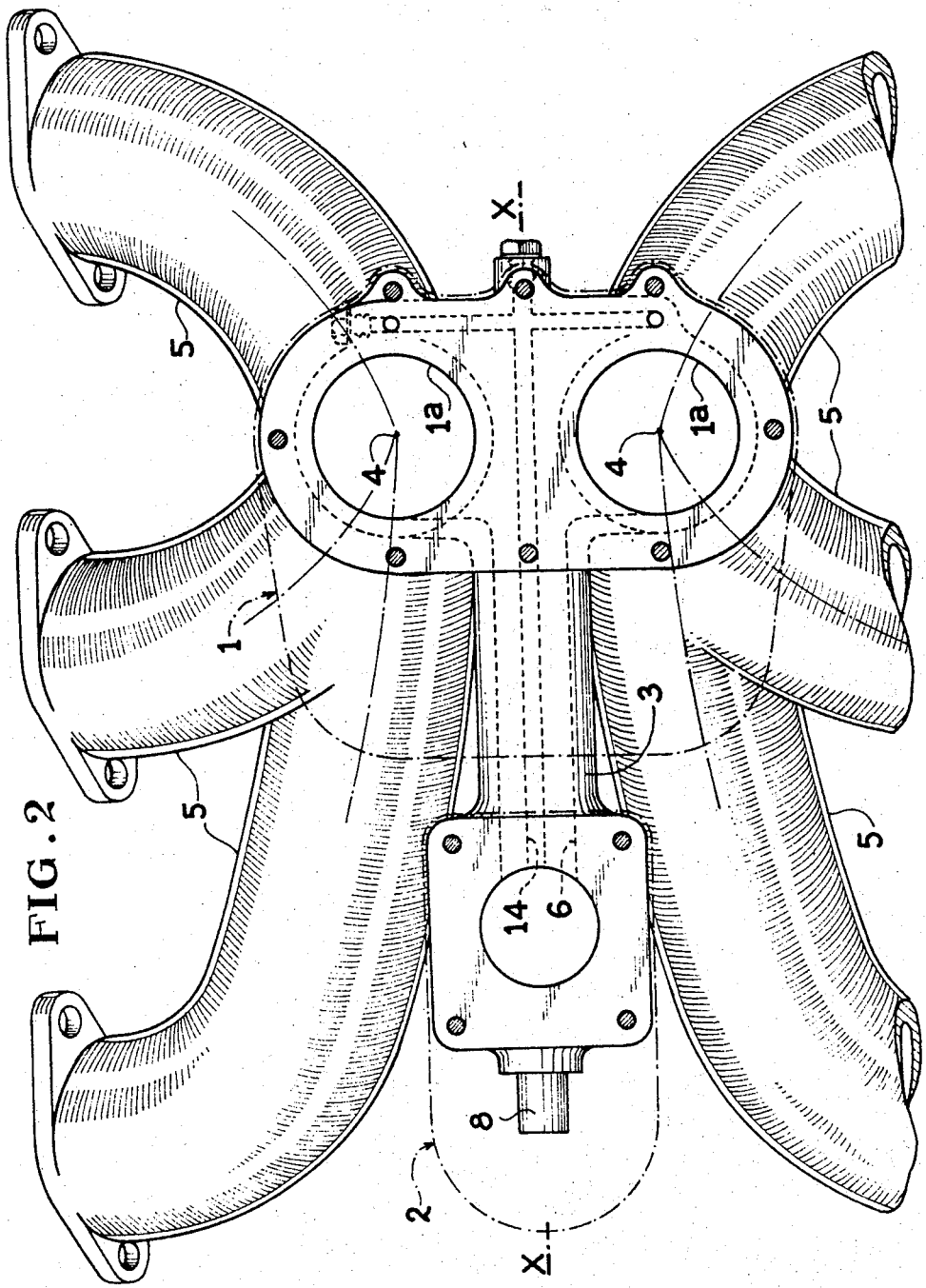

In the drawings:

FIG. 1 is a diagrammatic longitudinal sectional view, with parts cut away, of a fuel feed device according to the invention, and FIG. 2 is a plan view of the device shown in FIG. 1.

In the presently-described embodiment, the invention is applied to a six-cylinder V-engine.

The fuel feed device comprises mainly a large carburetor 1 having two bodies 1ª and a small carburetor 2 mounted on a common base 3.

The large carburetor 1 is placed in such manner that its two bodies are symmetrical with respect to a plane of symmetry X—X of the engine and disposed respectively substantially above the point of concurrence 4 of the axes of the induction pipes 5 leading to the cylinders (not shown) located on the same side of the engine.

The small carburetor 2 is disassociated from the large carburetor and located in the plane X—X just above one end of a passage 6 whose other end under the large carburetor leads to the points of junction 4 of the induction pipes 5. The passage 6 is defined at least partially by a double wall constituting a water jacket 7. This water jacket 7 is connected by connections 8 and 9 to the cooling system of the engine. The shape of the passage 6 is not critical and there is no need to be concerned with its aerodynamic qualities so that there is turbulence of the mixture passing therethrough. In order to achieve a sufficient heating of the mixture, the length of the passage 6 must be at least of the order of magnitude corresponding to twice the diameter of a circle having an area equal to the cross-sectional area of the passage.

It is known that, in a fuel feed system of the compound type, it is necessary to associate with each of the carburetors an idling circuit which feeds fuel permanently to the induction pipe, whether the throttles are open or closed, so as to ensure a correct priming of the transition by-passes and the maintenance of the constant level in the float chamber in the event of poor sealing of the float spindles.

There has been shown associated with the small carburetor 2 the idling circuit 10 which has its outlet located in the known manner under the fuel throttle 11. The idling circuit of the large carburetor 1 is shown at 12 and its throttle at 13. This idling circuit 12 feeds fuel, in the presently-described arrangement, to a conduit 14 which has its outlet near the outlet of the idling circuit 10 of the small carburetor. In this way, the two idling flows of the primary air fuel mixture are advantageously subjected to heating and mixing along the passage 6.

As concerns low loads and so long as the throttle 13 remains closed, the air fuel mixture passing through the throttle 11 is added to the idling flows of the two carburetors and the whole of the mixture passes through the passage 6 where it undergoes a heating and mixing which thereby ensures a good homogenization. In this way, ideal conditions of operation are achieved and this considerably reduces the percentage of pollutants in the exhaust gases.

As concerns high loads, the throttle 13 is opened and the fuel feed occurs normally and directly with minimum pressure drops.

It must be understood that the invention is not intended to be limited to the case of a V-engine and that is is also applicable when the main carburetor has only a single body.

Having now described my invention what I claim as new and desire to secure by Letters Patent is:

1. A device for feeding a mixture of air and fuel to a multiple-cylinder internal combustion engine, comprising a large main carburetor for feeding fuel at full load and having a large-section outlet and a throttle controlling the section of the outlet, a small carburetor for feeding fuel at low loads and having a small-section outlet of smaller section than said large-secstion outlet and a throttle controlling the section of the outlet of the small carburetor, induction pipes for connection to each of the cylinders of the engine, the induction pipes being interconnected at a junction, the large carburetor being located adjacent to and substantially in vertical alignment with said junction and the large-section outlet communicating substantially directly with said junction, the small carburetor being disassociated from the main carburetor and being more remote from said junction than the main carburetor, and means defining a mixture heating passage interposed between and interconnecting the outlet of the small carburetor and said junction of the induction pipes downstream of the throttle controlling the outlet of the main carburetor with respect to the flow of the mixture to said junction, means for heating said mixture heating passage substantially throughout the length of said mixture heating passage between the outlet of the small carburetor and said junction, the main carburetor comprising an idling circuit having an outlet and means defining a second passage which puts the idling circuit outlet in communication with an upstream end of the heating passage remote from said junction and adjacent the small caburetor and downstream of the throttle of the small carburetor.

2. A device as claimed in claim 1, comprising a common base for the two carburetors to which base the junction of the induction pipes is connected, a chamber in the base for connection to a source of a heating fluid, the base defining the heating passage which passage is surrounded at least partially by said chamber, the base further defining the passage putting the outlet of the idling circuit of the main carburetor in communication with said end of the heating passage.

3. A device as claimed in claim 1, wherein the heating passage has a length which is equal to at least twice the diameter of a circle having an area equal to the cross-sectional area of the heating passage.

4. A device for feeding a mixture of air and fuel to an internal combustion engine having two rows of cylinders, comprising two large main carburetors for respectively feeding the mixture to the two rows of cylinders and respectively having a large-section outlet and a throttle controlling the section of the outlet, a small carburetor feeding fuel at low loads and having a small-section outlet of smaller section than said large-section outlet and a throttle controlling the section of the outlet of the small carburetor, first induction pipes for connection to one row of cylinders and second induction pipes for connection to the other row of cylinders, the first induction pipes and the second induction pipes being respectively interconnected at a first junction and a second junction, the two main carburetors being respectively located adjacent to and substantially in vertical alignment with the first junction and second junction, the outlets of the two main carburetors communicating respectively substantially directly with the first junction and second junction, the small carburetor being disassociated from the main carburetors and being more remote from the first junction and second junction than the main carburetors, means defining a mixture heating passage interposed between and interconnecting the outlet of the small carburetor and both the junctions of the induction pipes downstream of the throttles controlling the outlets of the main carburetors with respect to the flow of the mixture to said junctions, means for heating said mixture heating passage substantially throughout the length of said mixture heating passage between the outlet of the small carburetor and said junctions, the small carburetor and the heating passage being contained substantially in a plane and the two main carburetors being located on opposite sides of said plane, each main carburetor comprising an idling circuit having an outlet, and second passage means putting the idling circuit outlet of each main carburetor in communication with an upstream end of the heating passage remote from said junction and adjacent the small carburetor and downstream of the throttle of the small carburetor.

* * * * *